July 31, 1945. G. R. HARRINGTON 2,380,646
FLEXIBLE COUPLING
Filed Oct. 4, 1941
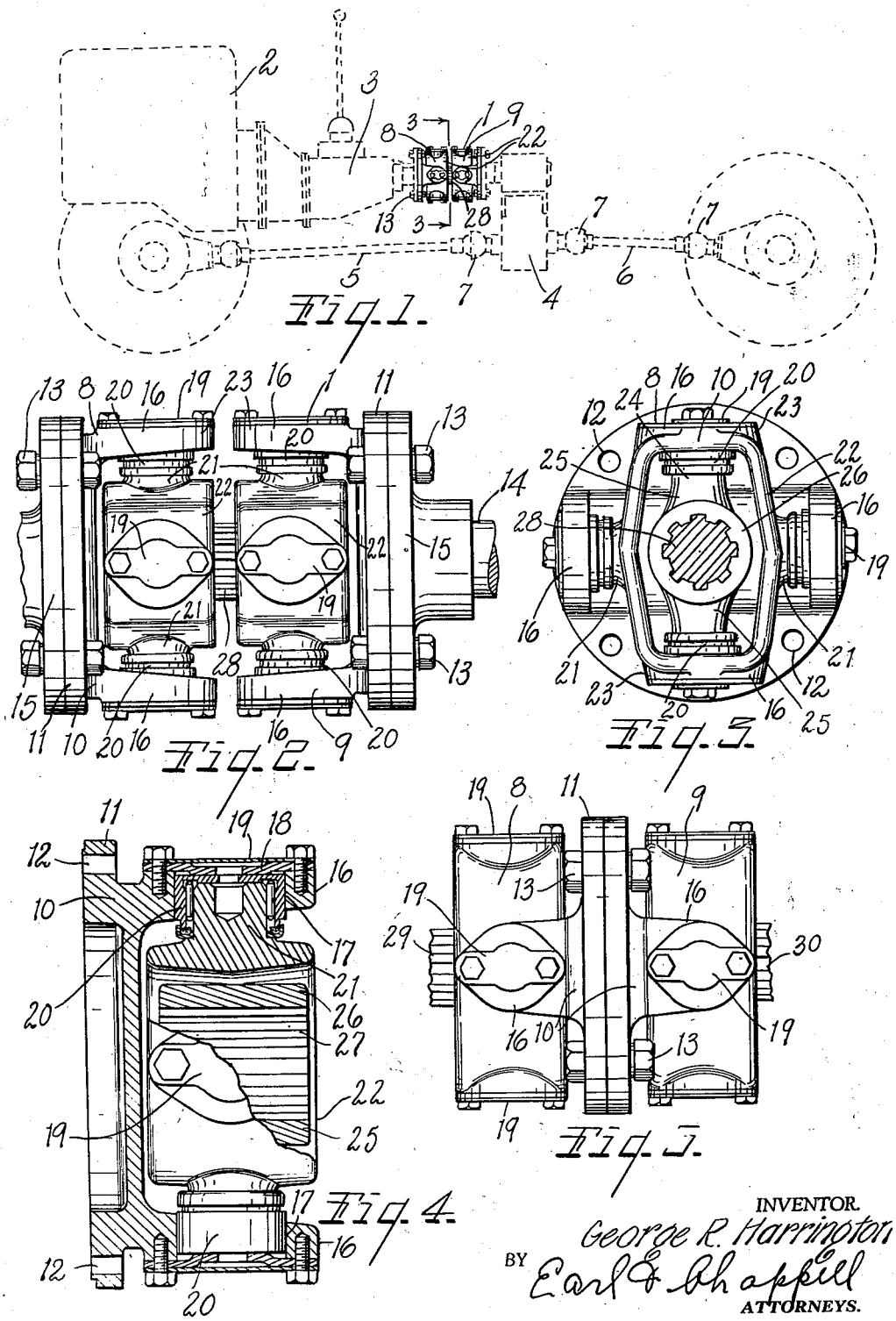
INVENTOR.
George R. Harrington
BY Earl F. Chappell
ATTORNEYS.

Patented July 31, 1945

2,380,646

UNITED STATES PATENT OFFICE 2,380,646

FLEXIBLE COUPLING

George R. Harrington, Kalamazoo, Mich., assignor to Blood Brothers Machine Company, Allegan, Mich., a corporation of Michigan Application October 4, 1941, Serial No. 413,604

2 Claims. (Cl. 64—21)

The main objects of my invention are:

First, to provide an imprfoved universal or flexible coupling primarily characterized by its very strong, rugged construction and the compact, consolidated relation of the parts thereof, whereby substantial saving of axial space is effected.

Second, to provide a coupling of the type described particularly designed for use in trucks and the like, wherein the saving of space and close coupling is a factor of decided importance.

Further objects relating to details and economies of my invention will appear from the description to follow. The invention is defined in the claims.

A structure embodying the features of my invention is illustrated in the accompanying drawing, wherein:

Fig. 1 is a view showing the universal coupling of my invention operatively associated in its intended relation in a power plant and power transmission system of a four wheel drive truck or bus, the parts of which are indicated in dotted lines.

Fig. 2 is a fragmentary view in side elevation showing the coupling of my invention operatively connected to driving and driven shafts for the transmission of power therebetween, regardless of axial misalinement thereof, this view showing one possible arrangement of the coacting units constituting the coupling.

Fig. 3 is a view in section on line 3—3 of Fig. 1, further illustrating the construction and arrangement of parts of the coupling of my invention, in the adaptation according to Figs. 1 and 2.

Fig. 4 is a view partially broken away and in vertical section, further illustrating the relation of the parts and details of the journal construction of a unit constituting one of the parts of the coupling.

Fig. 5 is a fragmentary view in side elevation generally similar to Fig. 2, but with the coacting units of the coupling arranged in a modified manner.

Referring to Fig. 1, I illustrate and indicate by the reference numeral 1 the flexible or univarsel coupling of my invention in a preferred or intended adaptation thereof in the power transmission line of a four wheel drive truck, the engine of which is indicated by the reference numeral 2 and from which power is transmitted through a conventional gear selector or change-speed mechanism 3 to the coupling 1. From the coupling, the power is transmitted to a conventional type torque divider 4, inasmuch as in the illustrated embodiment the truck is of the four-wheel drive type. The power is distributed from the torque divider through forwardly and rearwardly extending propeller shafts 5, 6 to the front and rear wheels respectively, universal joints 7 of the conventional type being employed in this connection.

In trucks of the foregoing type, a factor of very great importance is the conservation of longitudinal space. Inasmuch as these trucks are ordinarily employed in the hauling of trailers or other elongated structures, every inch added to the length of the power transmission line represents a corresponding addition to the length of the truck and trailer as a whole.

Moreover, inasmuch as the coupling of the present invention is disposed directly adjacent the power outlet side of the speed change mechanism 3, it is highly desirable that the same be of very strong and rugged construction so as to withstand the shocks and loads incident to its use. The coupling of the present invention satisfies both these requirements as to economy of space and strength and is, moreover, of relatively simple, inexpensive construction and well adapted for installation in existing power transmission systems to accommodate misalinement of the driving and driven shafts thereof.

Referring to Fig. 2, the coupling 1 as a whole comprises two coacting coupling units designated generally by the numerals 8, 9, which are of identical construction, hence only one thereof will be described. These units may be associated relative to one another in different manners without, however, detracting from the foregoing advantages, in accordance with the requirements of various installations, as will be referred to more particularly in the description to follow.

Each of the joint assemblies, as clearly illustrated in Figs. 2, 3 and 4, consists of an attaching or flange yoke 10 which, in the illustrated embodiment, has a circular flange 11 provided with holes 12 for the reception of bolts 13 by which the unit is operatively secured to a driving or driven shaft 14, or alternatively, by which two of the units are secured to one another in case they are employed in the manner shown in Fig. 5. In the embodiment of Fig. 2, however, the shaft 14 is drivingly secured to a suitable adaptor base 15 with which the bolts 13 coact to rigidly connect the units to the respective associated shafts.

The flange yoke 10 is in the form of a strong, heavy substantially flat, plate-like casting or forging and is provided with a pair of relatively large, strong forks or ears 16 disposed diametrically opposite one another and provided with alined bearing receiving recesses 17 which are closed at their outer ends by suitable closure and bearing retaining structure, including the apertured end plate 18 and a disk 19 bolted externally to the ear to secure the parts onto the latter. It will be understood that the bearing receiving recesses or openings 17 have the axes thereof normal to and intersecting the axis of rotation of the respective flange yokes 10.

The bearing openings 17 are provided with internal bearings 20 of the roller type, which rotatably receive the end trunnions 21 of an outer center member 22 in the form of a heavy open forging, this latter member having a generally elongated 0 section, as clearly illustrated in Fig. 3. These trunnions are disposed on the shorter sides of the elongated 0 form. Thus, it will be seen that the outer center member 22 swivels freely on its trunnions 21 in the bearing ears 16 on the flange yoke or support, on an axis normal to the axes of the two yokes or supports of the assembly, in neutral alined position thereof.

The outer center member 22 is provided at each of the opposed longer ends thereof with a bearing or journal arrangement which is in all substantial respects similar to the bearings in the yoke ears 16, hence indicated by similar reference numerals. For this purpose the member is made heavier at these ends by a boss 23 which is machined centrally for the reception of the roller bearing assembly. Rotatable in these last named bearings are the trunnion-like ends 24 of an elongated post-like or pillar-like inner center member 25, which is receivable in its entirety interiorly of the outer center member. As clearly illustrated in Figs. 3 and 4, the inner center member is therefore rotatable on an axis co-planar with the axis of the outer center member 22 and at 90 degrees thereto so that inner member 25 is capable of a universal action when yoke 10 is rotated. The two sets of bearings carried by the outer center member and the yoke are, of course, in the same plane.

The inner center member 25 is centrally enlarged and provided with a lateral boss at 26, which latter has a splined opening 27, the axis of which is normal to the axis of the center member 25, likewise to the plane of the outer member in neutral position thereof. The splined opening 27 drivingly receives a connector stub shaft 28 which is, in this adaptation of Figs. 1 and 2, an intermediate short shaft interconnecting the two joint units 8, 9. It will be apparent to those skilled in the art that other driving connections than the splines could be adapted, such as a pinned or keyed connection, so long as the inner center member 25 is effectively connected to a driving or driven shaft, which in this case is stub shaft 28. The latter, shown in Fig. 2, is similarly connected to the inner center member swivel 25 of the coacting coupling unit of the assembly. It will be noted by reference particularly to Fig. 3 that each opening 12 in the yoke 10 is disposed adjacent a longer side of the elongated hollow outer member 22, and is disposed within the angular distance between said longer side and a line connecting the diametrically opposed ear-like members 16. This not only permits an attaching bolt 13 extending through an opening 12 being readily accessible but also permits the bolt being disposed relatively closer, the axis of rotation of the yoke thereby permitting a reduction in the diameter of a coupling unit. It also permits an elongated hollow member 22 being oscillated on the ear-like members 16 without engaging the heads of said bolts, thereby permitting a reduction in the axial dimension of a coupling unit.

It will be apparent from the foregoing description that the present invention completely eliminates the need for the separate connecting inner cross heretofore employed in most universal joint constructions, by substituting the hollow outer center swiveling member 22 and the coacting inner center member 25 mounted entirely within the confines thereof. There is, as clearly evident from inspection of Fig. 4, a substantial axial compacting and a consolidation of functions as a result of this arrangement. Each unit of the assembly occupies no more axial space than the distance from one edge of its flange yoke 10 to the outer extremity of the bearing forks or ears 16. The pronounced axial overhang which is present when a pair of forked joint members and an interconnecting cross are employed is eliminated.

As stated above, the coupling units as described may be associated in the assembly in two different ways, shown respectively in Figs. 2 and 5. In the former the inner center members are rigidly interconnected by the short splined shaft 28, the units being in mutually facing opposed relation and the respective flange yokes 10 being bolted to driving and driven shaft adaptors or connectors. However, this arrangement may be modified by bolting the yokes 10 to one another, as illustrated in Fig. 5, with the respective units 8, 9 in opposed back-to-back arrangement, in which case driving and driven shafts 29, 30 respectively are splined or otherwise connected to the corresponding inner center members in the manner described. These installations are of course selectively available, depending upon the requirements of a particular installation. Whichever is employed, there results a univrsal flexible coupling which is characterized by its extreme strength and ruggedness and by a very decided economy of space which it makes possible.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A universal coupling of the type described comprising a pair of similar rotatable coupling units each comprising a rotatable yoke including a substantially flat plate-like member disposed in a plane extending transversely of the axis of rotation of the yoke, said plate-like member having integral therewith and projecting from a face thereof a pair of diametrically opposed axially projecting ear-like bearing members, an elongated hollow outer center member having the pair of longer sides thereof disposed between and journalled on said ear-like bearing members on an axis normal to and intersecting the axis of the yoke, said plate-like member having perforations therethrough for passage of attaching means, each perforation being disposed within the angular distance between one of the longer sides of said elongated hollow member and a line connecting said ear-like bearing members, a post-like inner center member disposed in its entirety within the hollow interior of said outer center member and journalled therein on an axis intersecting and normal to the axis of the outer member, the axes of said inner and outer members being substantially coplanar, said inner member having splined means for internally receiving a connector shaft disposed normal to the plane of said members, and a connector shaft drivingly connected by said splined means to the respective inner members to drivingly connect said units, said connecting shaft being bodily supported by the splined means of the respective inner members to constitute a complete universal coupling.

2. In a universal coupling of the type described, a pair of similar coupling units, each comprising a rotatable disk-like member provided with a pair of diametrically opposed axially projecting ear-like bearing members on one of the lateral faces of the disk-like member, the opposite lateral face of said member constituting an attaching face for the unit, an elongated hollow outer center member disposed between and journaled on said ear-like bearing members on an axis normal to and intersecting the axis of rotation of the disk-like member, an inner center member disposed substantially within the hollow interior of the outer center member and journaled therein on an axis in 90 degree relation to the axis of the outer member, said inner member having means for drivingly receiving the end of a shaft disposed normal to and intersecting the axes of the inner center and outer center members, the disk-like members having openings therein for the purpose of receiving therethrough attaching means for the units, the openings in one disk-like member adapted to register with the openings in the other disk-like member, each opening being disposed within the angular distance between one of the longer sides of said elongated hollow outer member and a line connecting said ear-like bearing members.

GEORGE R. HARRINGTON.